United States Patent
Duvall et al.

(10) Patent No.: US 8,239,271 B2
(45) Date of Patent: Aug. 7, 2012

(54) METHODS AND APPARATUS FOR MANAGING SEQUENCING OF DATA RECEIVED FROM DEVICES IN A RETAIL POINT OF SALE SYSTEM

(75) Inventors: Roger Warren Duvall, Atlanta, GA (US); Michael Jordan Reece, Lawrenceville, GA (US); Vincent J. Hrabosky, Duluth, GA (US); David John Burton, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 1285 days.

(21) Appl. No.: 09/946,026

(22) Filed: Sep. 4, 2001

(65) Prior Publication Data

US 2003/0083944 A1    May 1, 2003

(51) Int. Cl.
G06G 1/12 (2006.01)
G06Q 20/00 (2006.01)
(52) U.S. Cl. .............................. 705/21; 705/26; 235/375
(58) Field of Classification Search ...................... 705/21
See application file for complete search history.

(56) References Cited

U.S. PATENT DOCUMENTS

| | | | | |
|---|---|---|---|---|
| 4,445,177 A * | 4/1984 | Bratt et al. | ..................... | 712/245 |
| 5,481,689 A * | 1/1996 | Stamm et al. | .................. | 711/202 |
| 5,551,021 A * | 8/1996 | Harada et al. | ............... | 707/104.1 |
| 5,572,653 A * | 11/1996 | DeTemple et al. | ............ | 345/501 |
| 5,696,909 A * | 12/1997 | Wallner | ........................... | 705/44 |
| 5,696,924 A * | 12/1997 | Robertson et al. | ............ | 711/202 |
| 5,712,629 A * | 1/1998 | Curtiss et al. | ............... | 340/825.5 |
| 5,798,510 A * | 8/1998 | Watanabe et al. | ............. | 235/462 |
| 5,825,002 A * | 10/1998 | Roslak | ........................... | 235/375 |
| 5,924,077 A * | 7/1999 | Beach et al. | ..................... | 705/10 |
| 6,179,206 B1 * | 1/2001 | Matsumori | .................... | 235/383 |
| 6,195,703 B1 * | 2/2001 | Blumenau et al. | ............ | 709/238 |
| 6,257,490 B1 * | 7/2001 | Tafoya | ..................... | 235/462.24 |
| 6,315,199 B1 * | 11/2001 | Ito et al. | ......................... | 235/383 |
| 6,408,344 B1 * | 6/2002 | Sakai | .............................. | 710/20 |
| 6,449,646 B1 * | 9/2002 | Sikora et al. | .................. | 709/226 |
| 6,546,441 B1 * | 4/2003 | Lum | ................................ | 710/72 |
| 6,574,674 B1 * | 6/2003 | May et al. | ..................... | 719/310 |
| 6,618,117 B2 * | 9/2003 | Silverbrook | .................... | 355/18 |
| 6,856,964 B1 * | 2/2005 | Sadler | ............................. | 705/16 |
| 6,929,177 B2 * | 8/2005 | Matsko | ......................... | 235/379 |
| 6,980,963 B1 * | 12/2005 | Hanzek | ........................... | 705/26 |
| 6,990,659 B1 * | 1/2006 | Imai | ............................. | 717/171 |

* cited by examiner

*Primary Examiner* — Luna Champagne

(74) *Attorney, Agent, or Firm* — Paul W. Martin; Harden E. Stevens, III; Peter H. Priest

(57) ABSTRACT

Techniques for managing data received from devices in a point of sale system are described. A point of sale system is operated utilizing independent software objects including a device sequence manager. The device sequence manager communicates with each device producing data for which proper sequencing must be maintained. Upon receiving a data event from a device, the device sequence manager creates a data object and stores the data object in an output queue. Upon receiving a request for data from an executive application, the device sequence manager retrieves the data object from the output queue and transfers it to the executive application, maintaining the sequence in which the data objects were received from the devices.

4 Claims, 9 Drawing Sheets

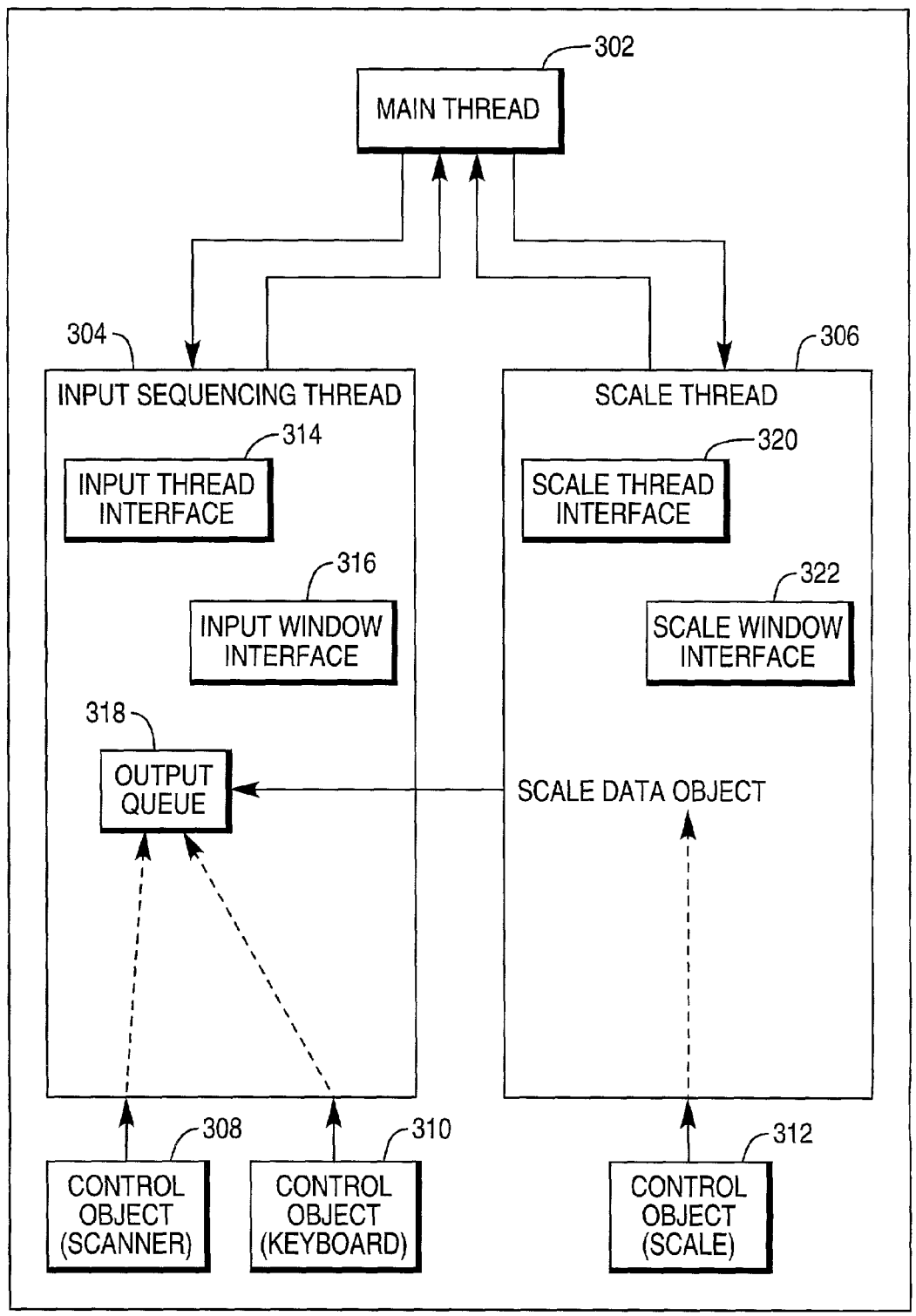

METHODS AND APPARATUS FOR MANAGING SEQUENCING OF DATA RECEIVED FROM DEVICES IN A RETAIL POINT OF SALE SYSTEM

FIELD OF THE INVENTION

The present invention relates generally to improvements to data management in retail point of sale systems. More particularly, the invention relates to methods and apparatus for a device sequence manager for managing the operation of input devices employed by a point of sale system and receiving and buffering data, as well as error and status messages, from those devices and presenting the messages in the correct sequence to an executive application program performing overall control of the system operation.

BACKGROUND OF THE INVENTION

Point of sale systems typically comprise a number of different devices. Particularly important in the operation of point of sale systems are data collection devices such as keyboards, scanners, scales and the like. The point of sale system employs software to control the data collection devices, as well as other hardware components comprising the system and to process transactions. The software controlling the system must be properly coordinated when necessary to prevent erroneous data sequencing and other problems. Proper coordination is particularly important in the case of data collection devices which collect data items making up a point of sale transaction. If data items collected by components of a point of sale system are processed out of the order in which they are produced, this lack of proper sequencing can lead to erroneous results such as erroneous transaction entries. For example, suppose an operator scans a box of cereal and the data item created by the scan is buffered for some reason. The operator enters "5" on a keyboard, intending that the next scan of a product will be equivalent to scans of 5 identical products. This keyboard entry is buffered immediately. The scan of the box of cereal is then removed from the buffer and processed. The operator then scans the second product, which is a case of soda. Because of the buffering of the scan of the first product, a transaction entry is made reflecting a purchase of five boxes of cereal and one case of soda rather than the correct transaction entry, which should reflect a purchase of one box of cereal and five cases of soda.

In order to provide flexibility in designing and assembling a point of sale system, it is desirable to develop software for the system as a set of independent software components which can operate independently of one another. It is often desirable to use devices from different vendors to assemble a point of sale system, with each device being controlled by its own associated software, and it is also desirable to be able to substitute different or upgraded devices without changing the software of an already existing system. If the various software components used in the system are integrated with other components, it is difficult or impossible to use components from different vendors without adapting software used with the other components. It is also difficult to change components without changing the software in the existing system to adapt to the new components.

In order to provide flexibility in developing and using a point of sale system, it is highly desirable to use software development techniques which allow independent development and operation of different software components, producing software components that do not need to take into account the internal workings of other software components.

A point of sale system, for example, may employ an executive application to provide overall control of the system, while independent software components provide control for the devices used by the system. The executive application and the various software components communicate using the external interfaces belonging to each of the components. Such an arrangement provides the various components with independence of operation and provides flexibility in the operation of the system.

However, if software components are designed to as to maximize their independence from one another, a risk is introduced that internal operations of one component which are unknown to another component may cause conflicts or improper coordination between the components. One area in particular in which such a risk exists is, as noted above, the collection of data by various devices operating in the point of sale system and the presentation of this data for processing. If independent software components are used to control the collection of data and these components present data items to a controlling or executive module for processing, a risk exists that the data items will be presented out of sequence if the executive application is unable to receive and process the data when it is collected.

In order to preserve the independence of the executive application and the various software components which control hardware devices, the executive application and the other software components frequently do not include any facilities for sequencing data coming from hardware components. It will be recognized that any point of sale system will require proper sequencing of data and that the various components which collect the data and the components which receive the data for processing will not include facilities for sequencing if their independence from one another is to be maximized. There exists, therefore, a need for techniques that will provide for proper sequencing of data coming from devices belonging to a point of sale system while preserving the independence of the software components used in the point of sale system.

SUMMARY OF THE INVENTION

According to one aspect, a point of sale system according to the present invention employs a software component acting as a device sequence manager (DSM) in order to maintain sequencing of data collected by various devices. The point of sale system employs various data collection devices, each of which is controlled by an independent software component. The device sequence manager and the various software components may suitably be software objects developed using object oriented programming. The use of object oriented programming allows developers to produce software components which can interact with different software components produced by other developers simply by interacting with the interface presented by the software components.

Object oriented programming allows software to be designed using a library of objects. Each object is typically a set of code and data which can perform a given set of actions and has a set of characteristics defining the object and its behavior. An object is typically defined by a set of properties, methods and events, as well as messages. Properties are values characterizing or relating to the object. A property is analogous to a variable in conventional programming. A method is analogous to a function or subroutine in conventional programming. A method is executed in response to a call by an external object and may perform one or more actions and/or return one or more values to the external object. An event is analogous to an interrupt in conventional programming. It is an action initiated by the object, not in response to a call from an external object. For example, an object may monitor the condition of a power supply and return an error event when the output of the power supply exceeds certain parameters. Objects may also be characterized by messages, which define the communications they can receive from external objects. The properties, methods, events and messages characterizing objects present standardized interfaces to other objects, and one object can interact with another without knowing any details of the inner workings of an object.

Data collected by the devices is employed by an executive application, which controls the overall operation of the point of sale system and which processes transactions. The device sequence manager acts as an intermediary between the software components controlling the devices and the executive application. The device sequence manager is able to respond immediately to all data received from each device, so that software components controlling devices do not need to buffer the data. Instead, the device sequence manager buffers all data received from devices, in the sequence in which the data was collected by the devices, and presents it to the executive application upon receiving a request from the executive application.

In many instances, the executive application will be busy when data is collected by a device, and the ability of the DSM to immediately receive and buffer the data will be critical to maintaining proper sequencing of the data. The DSM allows buffering and sequencing of each data event as it is produced by a device, whether or not the executive application is ready to receive the data. When a device collects data, the software component controlling the device passes the data to the DSM, which immediately creates a data object and adds it to an output queue used to buffer data. Each data object preferably includes identification information, such as device class and device number information. Weight information from a scale is collected by polling the scale at repeated intervals and storing in the output queue each stable weight which is different from the previous stable weight. In order to prevent an excessive number of weight data objects from accumulating in the output queue, weight objects are removed from the queue when certain conditions are met. Typically, a weight object becomes obsolete if it is still present in the queue when a new weight object is placed in the queue. As each weight object is placed in the output queue, therefore, the previous weight object may suitably be removed by the DSM if it is still present. If desired, however, it is possible to implement a design in which the executive application is responsible for clearing weight objects from the output queue. In such a design, the most recent weight object in the output queue is understood to be the only valid weight object. After retrieving a weight object, the executive application retrieves all weight objects in the output queue and discards all weight objects except the most recent.

Upon receiving a data retrieval request from the executive application, the DSM examines the topmost object in the queue. The request from the executive application typically includes identification information. If the identification information for the topmost object in the queue matches the identification information in the request received from the retail application, the DSM removes the data object from the queue and transfers it to the retail application. If the topmost item in the queue contains an error, an error message is reported to the retail application and may also be logged by the retail application or by the DSM. If the topmost item in the queue does not match the identification information in the request, a notification to this effect is returned to the retail application and the retail application is allowed to repeat or modify the request.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates a device sequence manager according to the present invention;

DETAILED DESCRIPTION

Figure 1:
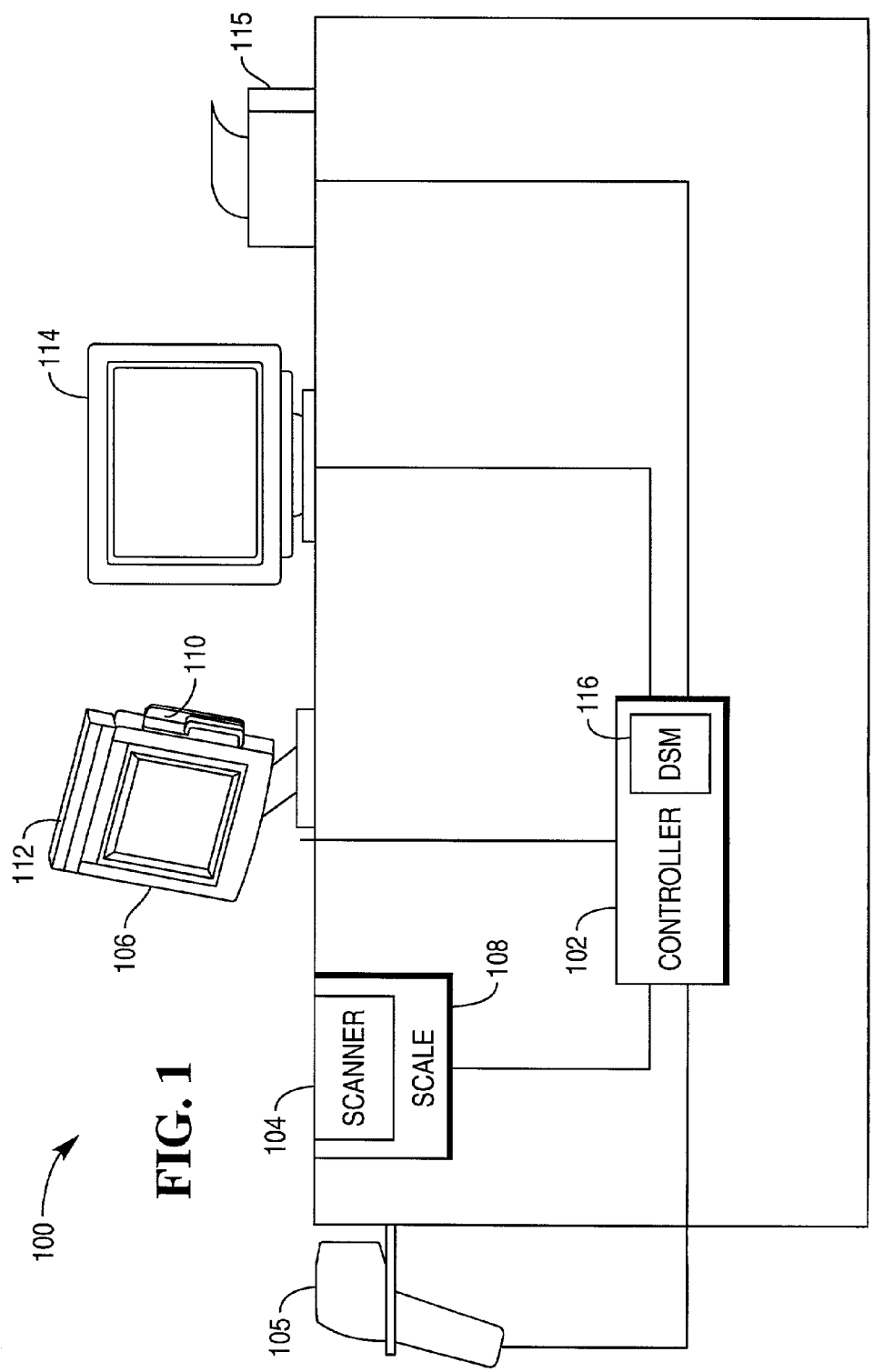
FIG. 1 illustrates a point of sale system according to the present invention.

FIG. 1 illustrates a point of sale system 100 which may advantageously employ a device sequence manager according to the present invention. The point of sale system 100 includes a central controller 102 which provides instructions to and receives data from a number of different devices, including first and second scanners 104 and 105, keyboard 106 and scale 108. The first scanner 104 may suitably be part of a scanner/scale combination including the first scanner 104 and the scale 108, and the second scanner 105 may suitably be a handheld scanner. The point of sale system 100 also includes a magnetic ink character recognition (MICR) reader 110, magnetic stripe reader (MSR) 112, display 114 and printer 115. All of the devices 104-115 provide data to and receive instructions from the central controller 102. Some of the devices, such as the display 114 and printer 115, primarily receive data from the central controller 102. The only data they provide to the central controller 102 relates to their identity, presence and correct functioning.

In order to process transactions correctly, the scanners 104 and 105, keyboard 106 and scale 108 provide data which must be received and processed by the central controller 102 in the same sequence in which the data is provided. Each of the scanners 104 and 105, keyboard 106 and scale 108 provides information components. In some cases two or more information components contributed by different devices must be assembled to make up a transaction entry. For example, an operator may enter a quantity on the keyboard 106 and then scan an item using the scanner 105. The quantity information provided by the keyboard 106 is combined with the item identification provided by the scanner 105 to specify the quantity and identity of the item. The controller 102 then searches for the per unit price of the item, computes the price and prepares a transaction entry for the purchase of the item. The controller 102 must receive the quantity information and item identification in the sequence in which they were provided, in order to correctly associate the quantity information with the identified item. If the controller 102 receives quantity information and identification information out of sequence, erroneous transaction entries may occur. For example, if an operator scans a first item, makes a keyboard entry indicating the quantity of the second item and then scans the second item, an erroneous transaction entry will occur if the identification information for the first item is delayed until after the keyboard entry and then processed before the identification information for the second item is processed.

Because of the various demands being made on the controller 102, the controller 102 may not always be prepared to receive data from a device when the device is ready to send the data. In order to preserve the correct sequence for data to be processed by the controller 102, a point of sale system 100 according to the present invention provides a mechanism for receiving data as it is provided by devices, maintaining the sequencing of the data and preserving the sequence of the data as it is processed by the controller 102. To this end, the point of sale system 100 employs a device sequence manager 116, preferably implemented as software executed by the controller 102 and illustrated below in greater detail in FIGS. 2 and 3. The device sequence manager 116 accepts all data produced by devices with which it is designed to operate, maintains the data in the proper sequence, that is, the sequence in which the data is provided by the devices, and supplies the data for further processing by a requesting application. The device sequence manager typically accepts data produced by the scanners 104 and 105, keyboard 106 and scale 108 because these devices produce data for which the correct sequence must be preserved. Sequencing is not critical for the data produced by other devices such as the MICR reader 110 and MSR 112, and is also not critical for devices such as the display 114 and printer 115, which primarily produce output. The device sequence manager 116 therefore does not receive or process data produced by these devices.

Figure 2:
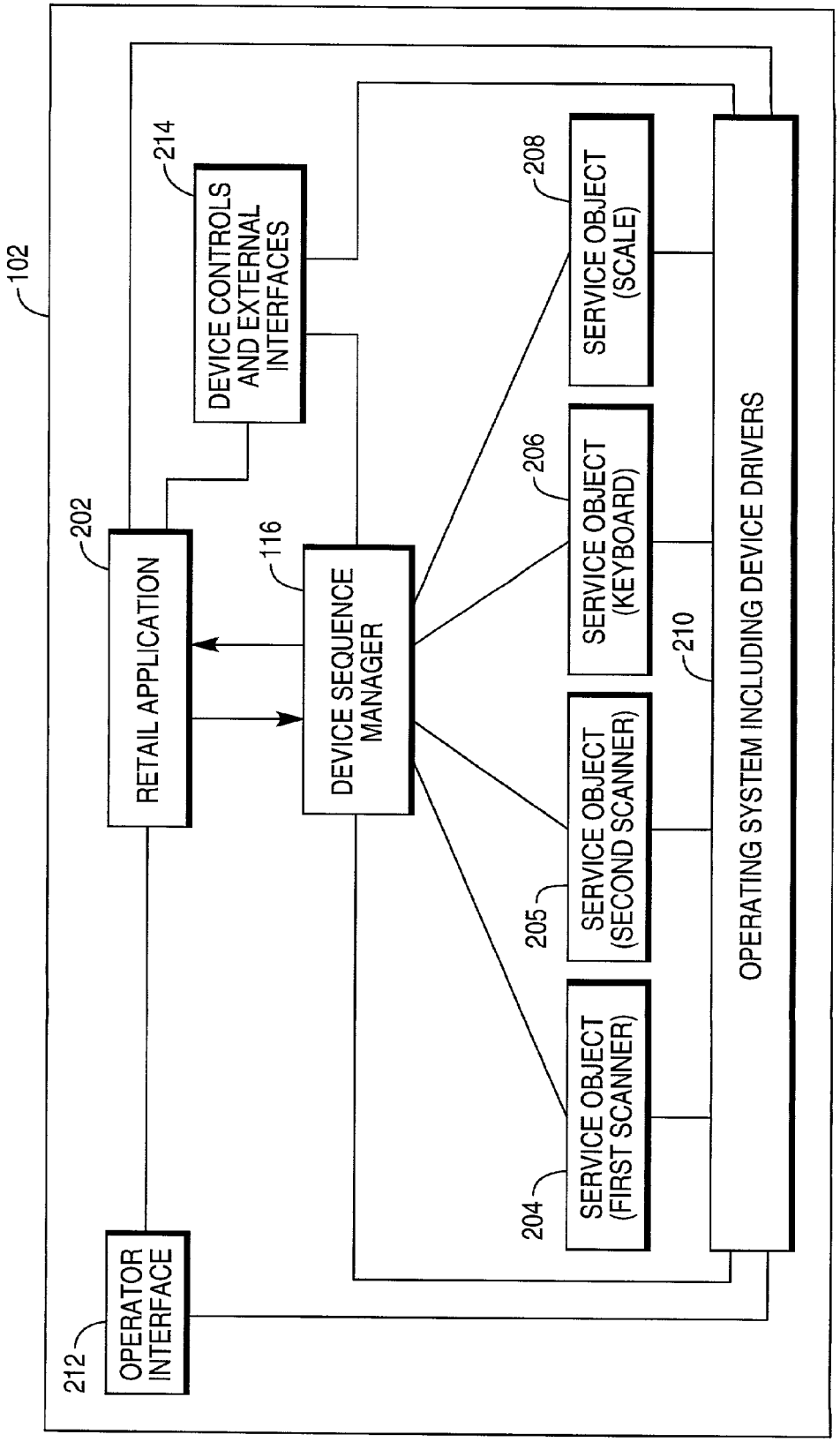
FIG. 2 illustrates functional details of operational software for a point of sale system including a device sequence manager according to the present invention.

FIG. 2 is a functional diagram illustrating the device sequence manager 116 as it interacts with other software components implemented by the controller 102. Overall control of the operation of the point of sale system 100 is performed by an executive application, shown here as a retail application 202, which is implemented by the controller 102 and which provides executive control of the point of sale system 100, receiving data, processing transactions and producing output. Data is supplied to the controller 102 by the scanners 104 and 105, keyboard 106 and scale 108. The retail application 202, DSM 116 and other software components controlling the point of sale system may suitably be designed using object linking and embedding for point of sale systems (OPOS). OPOS is a recently introduced protocol for development of software for point of sale systems. OPOS uses object oriented programming to provide a language neutral, operating system independent architectural system environment for point of sale service devices used in the retail environment. In a system using OPOS, each software component can be designed independently and components can be changed freely. Software developers do not need to contemplate or design for the use of specific hardware, and hardware components can be changed or upgraded without any need to change the system software or application software making use of the new or upgraded component.

The retail application 202 controls the point of sale system 100, and communicates with hardware devices such as the hardware devices 104-108 by transferring data and instructions to and from device independent software objects known as control objects. In the present exemplary embodiment, the control objects are initiated by and operated under the control of the DSM and are shown in greater detail in FIG. 3. One control object is required for each class of devices. Each control object presents a single interface to the retail application 202, no matter which specific device in the class is being used. For example, if the second scanner 105 shown in FIG. 1 is removed and an upgraded handheld scanner is substituted, neither the retail application nor the control object handling scanners will need to be changed. This approach allows substitution and upgrading of devices without any need to change the retail application 202.

The DSM 116 communicates with the devices 104-108 by transferring data and instructions to and from device dependent service objects. The service objects employed in the present exemplary configuration comprise a first scanner service object 204, a second scanner service object 205, a keyboard service object 206 and a scale service object 208. Each service object handles a single device using the point of sale system operating system 210 and communicates with device drivers for the device being handled. One service object is used for each device, and addition of devices, for example an additional scanner or keyboard, would require the addition of a service object dedicated to the control of that device.

The retail application 202 and the DSM 116 communicate with one another by transferring standardized messages which follow standard formats and rules. The DSM 116 communicates with the service objects 204-208 by employing its internal control objects to perform a similar transfer of standardized messages with the service objects 204-208. There is no need for the developer of the retail application 202 to know the details of the workings of the control objects or service objects, and there is no need for the developer of a control object or a service object to know the details of the workings of the retail application 202 or the other control objects or service objects.

The controller 102 also implements an operator interface 212, with which the retail application 202 communicates in order to display information to the operator and receive instructions from the operator. The controller 102 also implements a plurality of additional objects, shown here as device controls and external interfaces 214. The device controls and external interfaces provide control of devices such as the MICR reader 110 and MSR 112 mentioned above, as well as other devices which do not require the data sequencing services of the DSM, and also provides communication with external file servers and other devices needed for the operation of the point of sale system 100 and to provide for error logging and event tracing for later review by repair and software development personnel. The retail application 202, DSM 116, service objects 204-208, operator interface 212, and device controls and external interfaces 214 perform their various functions by interacting with the operating system 210. In the exemplary embodiment, the operating system 210 is a MICROSOFT WINDOWS 2000 environment including various device drivers to allow communication between service objects such as the service objects 204-208 and the devices with which they must communicate. The DSM 116 provides an interface with the retail application 202 by presenting various properties and methods which can be used by the retail application 202 to check the status and configuration of the DSM 116 and to control various aspects of the operation of the DSM 116.

Upon initialization of the point of sale system 100, the retail application 202 initiates operation of the DSM 116 and instructs the DSM 116 to initialize. Upon initialization, the DSM 116 initializes the devices with which it is configured to communicate. In a WINDOWS 2000 environment, parameters for the DSM and other OPOS components may be set using the MICROSOFT WINDOWS system registry. The devices with which the DSM communicates may be specified using an Advanced Checkout System (ACS) device initialization (devini) file. An exemplary devini file may include lines such as the following:
[DSM]
keyboard=KEYBOARD
scale=SCALE
scanner0=SCANNER
scanner1=SCAN2

These lines specify that the DSM will communicate with a keyboard, a scale and two scanners. The devini file will typically include specifications relating to each of the devices. For example, a devini file which includes the line above will also have a section with the header [SCANNER] and a section with the header [SCAN2]. An "order" number is used to distinguish scanner0 from scanner1. If the section with the header [SCANNER] includes the line "order-0", scanner0 will be the scanner described by that section. In that case, the section with the header [SCAN2] will include the line "order=1" and will describe scanner1. If desired, the DSM section of the devini file may include additional operating parameters and required features for each device.

In a WINDOWS 2000 implementation, a system registry (system.rg) file will preferably be included to build the OPOS section of the system.rg file for all certified devices, that is, all devices for which the system is certified to operate, in all configurations. The system.rg file will include a number of OPOS registry keys. Startup of the point of sale system will invoke a subsystem initialization module which will, during initialization, apply the .rg file, which is specified in the [SYSTEM] section of the devini file by the line "RegistryFileName=system.rg". Scanners and scales are preferably initialized to a disabled state, while keyboards are initialized to an enabled state. If an error occurs during initialization of a device, the DSM 116 logs an error. Once initialization of the DSM 116 is complete, the retail application 202 checks the status of the DSM 116 by making appropriate queries. The retail application 202 may suitably query the DSM 116 in order to determine which devices are available for use. In the query, the retail application identifies each class of devices for which information is sought, and the DSM 116 returns the number of available devices in each class. In addition, the retail application 202 can instruct the DSM 116 to provide information identifying the software version being used, the weight units returned by a scale or scales used with the point of sale system 100, or any other information which the DSM 116 may be designed to provide.

The DSM 116 may suitably be designed to allow the retail application 202 to enable or disable devices available for communication with the DSM, to retrieve data stored by the DSM 116, to clear data items stored by the DSM 116 and to terminate operation of the DSM 116. For each command received from the retail application 202, the DSM 116 suitably returns a message indicating if the commanded operation is successful and, if an error occurred, the nature of the error. The retail application 202 can use the message returned from the DSM 116 to determine its next action. For example, if a request for data returns a message indicating success, the retail application 202 can begin processing the data. If a request for data returns a message that no data exists, the retail application 202 can modify the request so as to identify a different device in the request and then present the modified request, perform error handling, or perform other processing or take other appropriate actions.

When the point of sale system 100 is ready to collect data and process transactions, the retail application 202 issues a command to the DSM 116 to enable the scanner 104 and keyboard 106. The retail application 202 preferably instructs the DSM 116 to enable the scale 108 only when it receives data identifying an item sold by weight. As the operator makes scans or keyboard entries in order to collect data, the scanner 104 and keyboard 106 produce data events. As each of the scanner 104 and keyboard 106 produces a data event, the data event is transferred to the DSM 116 by the service object controlling the device. The DSM 116 creates and buffers a data object and provides it to the retail application 202 as requested. The retail application 202 may be occupied with controlling the point of sale system 100, entering transactions, printing or other activities and therefore needs to be able to control its receipt of data entries so that it can receive data entries only when it is able to handle them. The DSM 116 has no other tasks except to collect data received from devices and to transfer data, error messages and status messages to the retail application 202 or to a log. The DSM 116, therefore, is able to immediately accept each data event as it is presented, whether or not the retail application 202 is ready to accept the data event. If the retail application 202 experiences delays in accepting or processing data, the DSM 116 holds the data while preserving its correct sequence, so that the delays experienced by the retail application 202 do not cause the data to be processed out of sequence.

FIG. 3 is a more detailed view of the DSM 116. The DSM 116 includes a main thread 302, an input sequencing thread 304 and a scale thread 306. The DSM 116 also includes control objects 308-312 for keyboards, scanners and scales, respectively. Each of the control objects 308-312 provides control for all devices within a class. For example, the control object 308 provides control for all keyboards belonging to the point of sale system 100. The input sequencing thread 304 includes an input thread interface 314 in order to provide an interface to the main thread 302. The input sequencing thread also includes an input window interface 316, in order to allow the queuing of error messages and status information for transfer to the retail application 202 or for logging, and an output queue 318 for buffering of data objects.

The scale thread 306 includes a scale thread interface 320 to provide an interface to the main thread 302, and a scale window interface 322 to allow the display of error messages and status information to an operator.

After the DSM 116 is initiated, the main thread 302 receives instructions and data requests from the retail application 202 as they are made and provides data to the retail application 202 as it becomes available. The input sequencing thread 304 waits to receive data events from each of the control objects 308-312. When the input sequencing thread 304 receives a data event from one of the control objects 308 or 310, it creates a data object and stores the data object in the output queue 318. The scale thread is active whenever the scale 108 is enabled. Enabling and disabling of the scale is performed in response to a command from the retail application 202. The retail application 202 enables the scale 108 whenever it receives data identifying an item to be weighed. For example, if the operator makes a data entry identifying bulk flour, the retail application 202 enables the scale upon receiving the data entry. When the scale 108 is enabled, the scale thread 306 polls the scale at regular intervals, for example every ¼ second, storing the results of the previous poll. Whenever the scale thread 306 reads a stable weight which is nonzero and is different from the previous stable weight, the scale thread 306 creates a data object and stores the data object in the output queue 318.

Because the scale thread 306 stores a weight every time a new stable weight is received, that is, a stable weight which is different from the most recent stable weight, the data objects produced by the scale thread will overload the output queue 318 unless proper steps are taken to remove obsolete data objects. Therefore, when the scale thread 306 stores a new weight in the output queue 318, it removes the weight previously placed in the output queue 318 if this weight is still present. An alternative design is possible, however, in which the scale thread 306 allows multiple weight objects to be present in the output queue 318. This design can be implemented if it is known that the executive application 202 will treat the most recent weight object in the output queue 318 as the only valid weight object. In such a case, the executive application 202 will sequentially retrieve all weight objects in the output queue 318 until the most recent weight object is retrieved, and will discard each weight object as it is retrieved if a more recent weight object exists in the output queue 318.

In order to retrieve data from the DSM 116, the retail application 202 makes requests for data. Each request identifies a device class and device identifier for which data is requested. When the main thread 302 receives a request for data from the retail application 202, it examines the topmost item in the queue. In the presently preferred embodiment, objects preferably include the class and identifying number of the device producing the data, for example keyboard 1. Similarly, the data request produced by the retail application 202 includes the class and identifying number of the device from which the requested data is sought. If the device class and number of the topmost data object match the device class and number of the data request, the main thread 302 removes the data object from the queue and supplies it to the retail application. If the device class and identifying number match but the data object contains an error, an error message providing information about the nature of the error is returned to the retail application 202. If the device class and identifying number of the topmost object in the queue 318 do not match the request received from the retail application 202, the DSM 316 returns a notice that no data is available from the device class and device specified. When this happens, the retail application 202 typically presents a new request, specifying a different device. The retail application 202 preferably presents a series of requests cycling through all devices in order to obtain data from the DSM 116, one request for each available device. When the topmost object in the output queue 318 does not match the specified device, the retail application 202 cycles to the next device. When the topmost object in the output queue 318 does match the specified device, the retail application 202 receives and processes the object and then cycles to the next device. For example, suppose the output queue 318 contains two scanner objects generated by the first scanner 104, a scale object and a keyboard object. In this example, the retail application 202 makes sequential requests specifying the scanner 104, the scanner 105, the keyboard 106 and the scale 108 and then repeats the sequence. The retail application 202 thus makes a request specifying the scanner 104. The DSM 116 delivers the scanner object, which is then processed by the retail application 202. The retail application 202 then makes a request specifying the keyboard 106. The DSM 116 returns a response specifying that no data exists. The retail application 202 then makes a request specifying the scale 108 and the DSM 116 again returns a response specifying that no data exists. The retail application 202 requests data from the scanner 104 and the data is delivered. The retail application 202 then requests data from the keyboard 106 and receives a response that no data exists. The retail application then requests data from the scale 108 and the data is delivered. The retail application 202 then requests data from the keyboard 106 and the data is delivered. At this point, all the data objects previously mentioned have been requested by and supplied to the retail application 202. The retail application 202 continues to perform its functions, such as concluding the transaction or requesting additional data objects which may have been added to the output queue 318 by the DSM 116.

When the DSM 116 experiences an error, a data object is created and placed in a queue in the input window 316. The input window 316 maintains the queue and delivers the data objects as requested by the retail application 202. Errors may suitably include notifications of invalid device requests, for example a device number which exceeds the maximum number of the specified class of devices or an invalid device class, a device failure, a request to a device which is configured but unavailable, a notification that no configured device of the requested class exists, an illegal request, a request to a device which does not support the request, an incomplete operation resulting from a timeout or a request to a device which is busy because it is being used by another process. Many errors, for example timeout errors or device busy errors, simply require the retail application 202 to repeat the request or to issue an appropriate command to the DSM 116. Such a command may be, for example, a command to clear the output queue in order to allow the data to be collected again. Some errors, such as a request to an unsupported device class, indicate a misconfiguration of the retail application 202. In such a case, the retail application 202 would send an operator notification to the operator interface 212, directing the operator to shut down the point of sale system 100 for reconfiguration. It is also possible to design the DSM 116 so that certain types of errors are logged, using an appropriate server interface included in the device controls and external interfaces 214.

The DSM 116 is preferably designed to allow for tracing, that is, the storage of data relating to specified operations for later review by a program developer. In an exemplary WINDOWS 2000 environment, the DSM employs certain standard OPOS tools to allow for tracing, most notably a data capture object which provides trace information relating to certain specified events. The trace information is stored in an appropriate location, such as a file belonging to a server, and is transferred to the file using an appropriate object among the device controls and external interfaces 214.

FIGS. 4A-4D illustrate, in sequence, the receiving and storage of keyboard and scanner data by the input sequencing thread 304 and the delivery of that data to the retail application upon request. Each of the FIGS. 4A-4D illustrates the retail application 202 communicating with the DSM 116. The DSM 116 can be seen to be communicating with the first scanner 104 and the keyboard 106 using the first scanner service object 204 and the keyboard service object 206, respectively. The DSM 116 includes the main thread 302, the input sequencing thread 304, the scanner control object 306 and the keyboard control object 308. For simplicity of illustration, the scale thread 306 is not shown here. The input sequencing thread 304 includes the input thread interface 314, the input window interface 316 and the output queue 318.

Figure 4A:
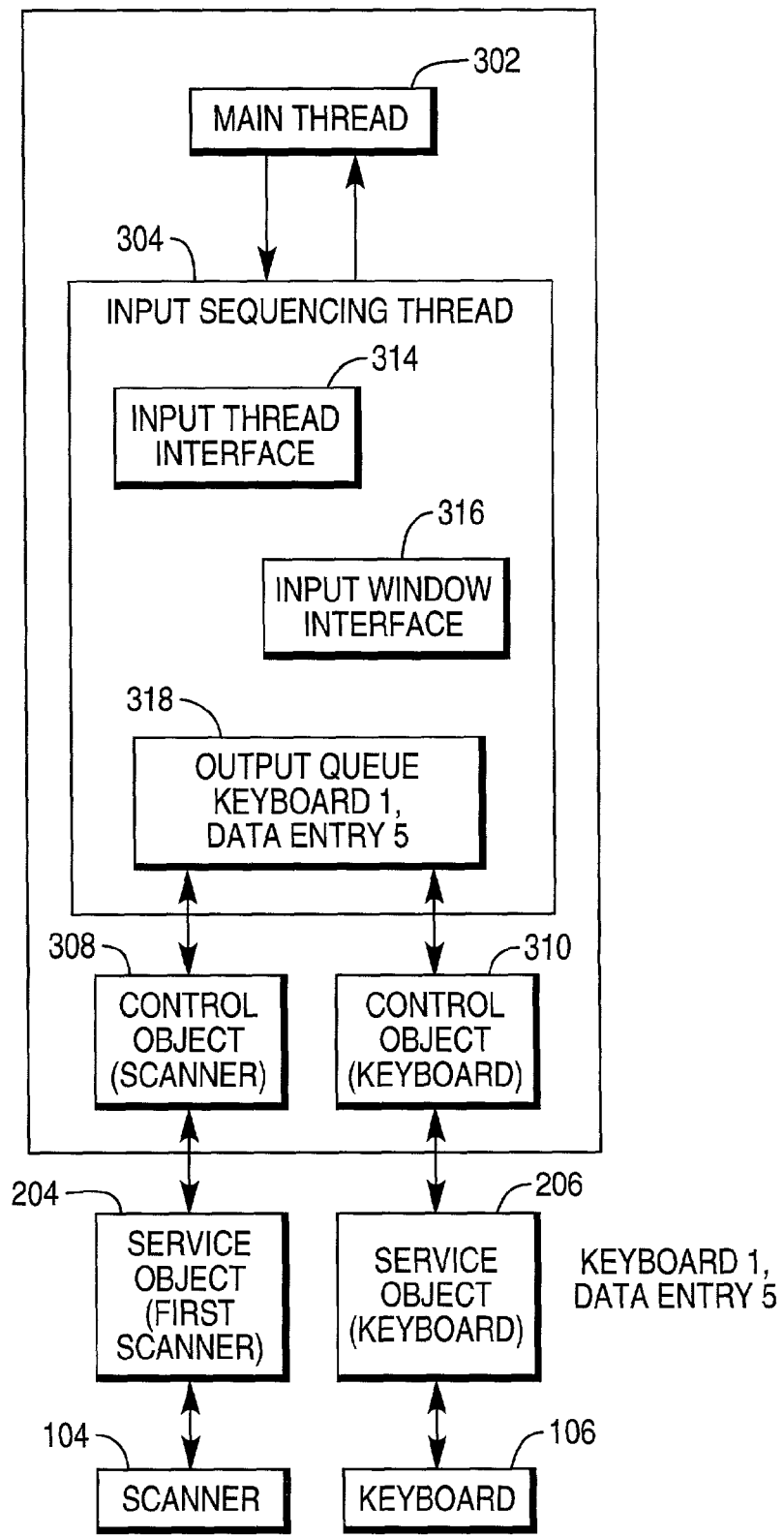
FIGS. 4A-4D illustrate the collection, queuing and transfer of data using a device sequence manager according to the present invention.

FIG. 4A illustrates the transfer of a data event from the keyboard 106 to the output queue 318. The keyboard 106 presents the data event to the DSM 116 through the keyboard service object 206. The data event includes the device identification, that is, keyboard 1, and the data, that is, the number 5. Upon receiving the data event, the DSM 116 creates a data object and transfers it to the output queue 318.

Figure 4B:
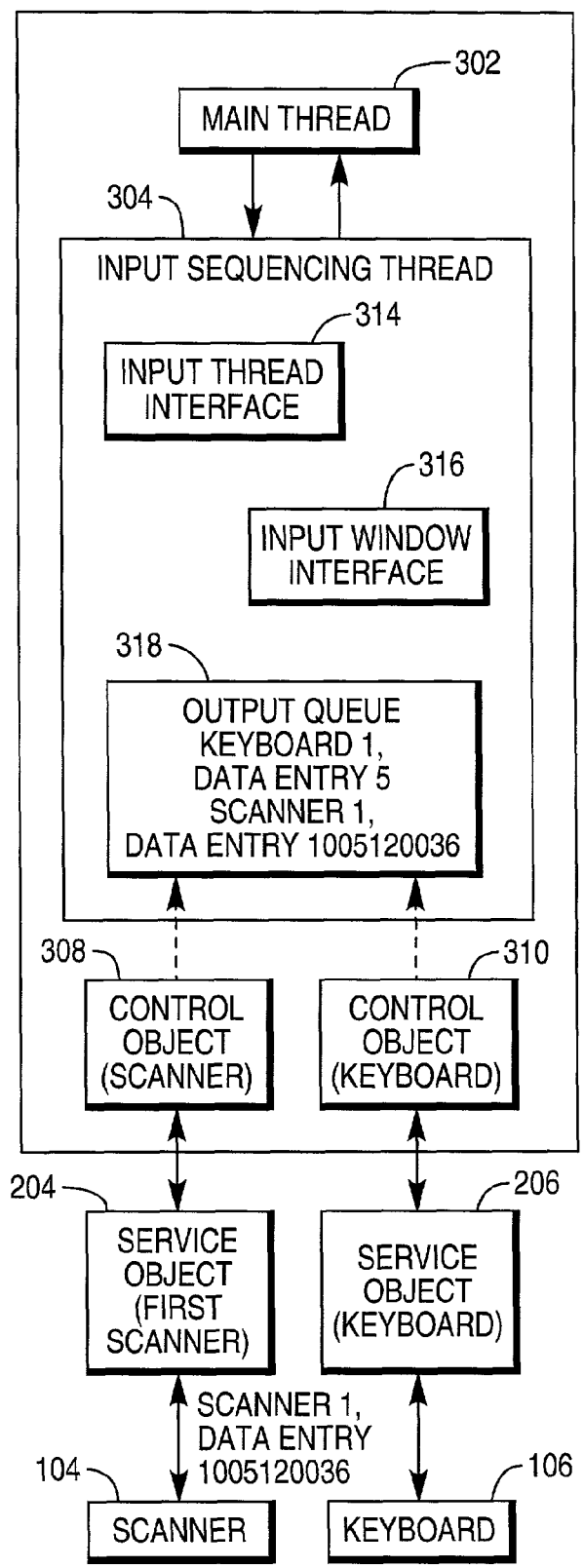

FIG. 4B illustrates the transfer of a data event from the scanner 104 to the output queue 318. The scanner 104 presents the data event to the DSM 116 through the scanner service object 204. The data event includes the device identification, that is, scanner 1, and the data, that is, the number 1005120036, which is a number extracted from a scan of a bar code label. Upon receiving the data event, the DSM 116 creates a data object and transfers it to the output queue 318, where it is placed beneath the previous data object, that is, keyboard 1, data entry 5.

Figure 4C:
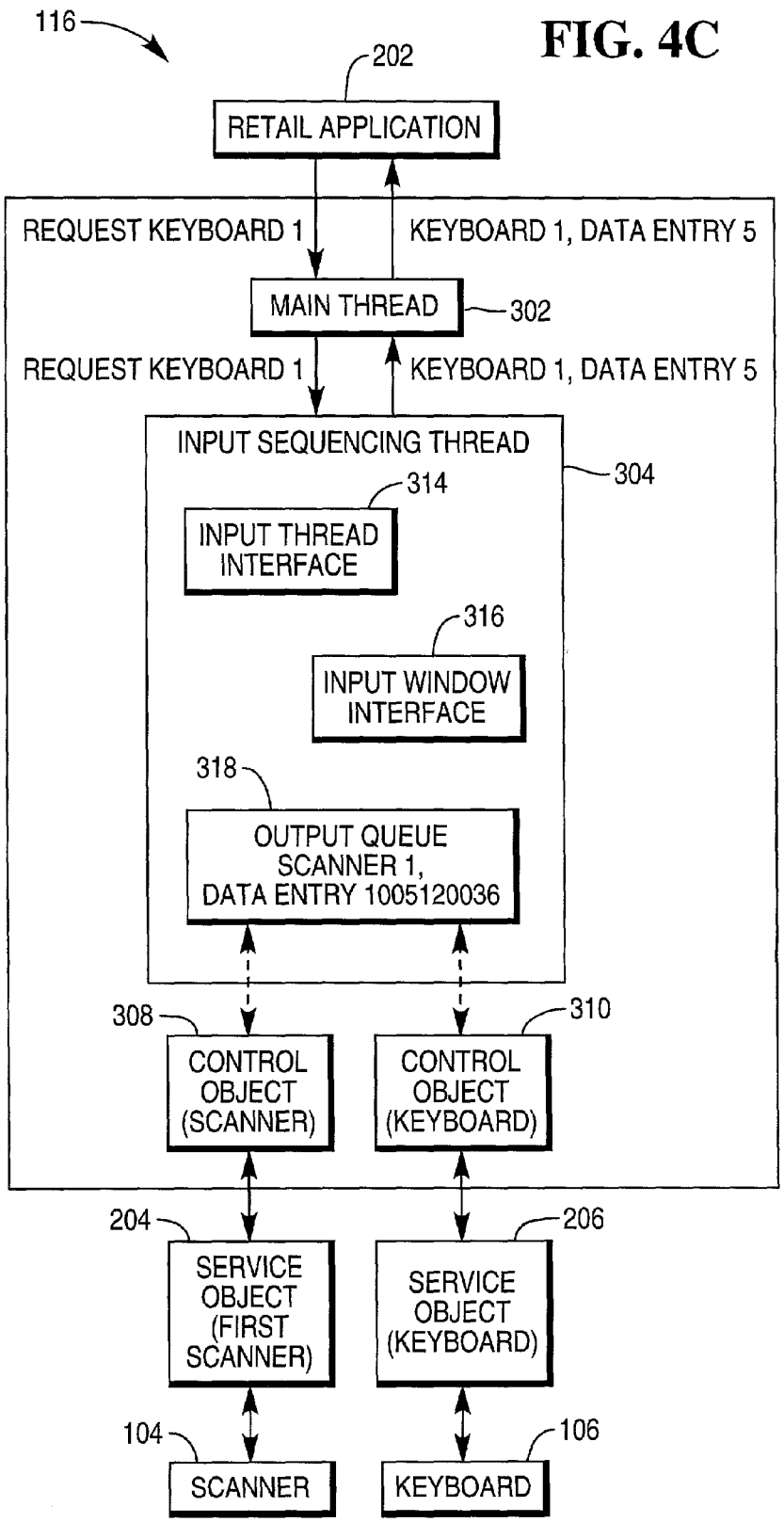

FIG. 4C illustrates the transfer of a stored data object in response to a request from the retail application. The retail application 202 presents a request for data from keyboard 1. The main thread 302 relays this request to the input sequencing thread 304, which examines the topmost data object from the queue 318 and, because its device identification matches the requested device identification, removes it from the queue and transfers it to the requesting application, that is, the retail application 202.

Figure 4D:
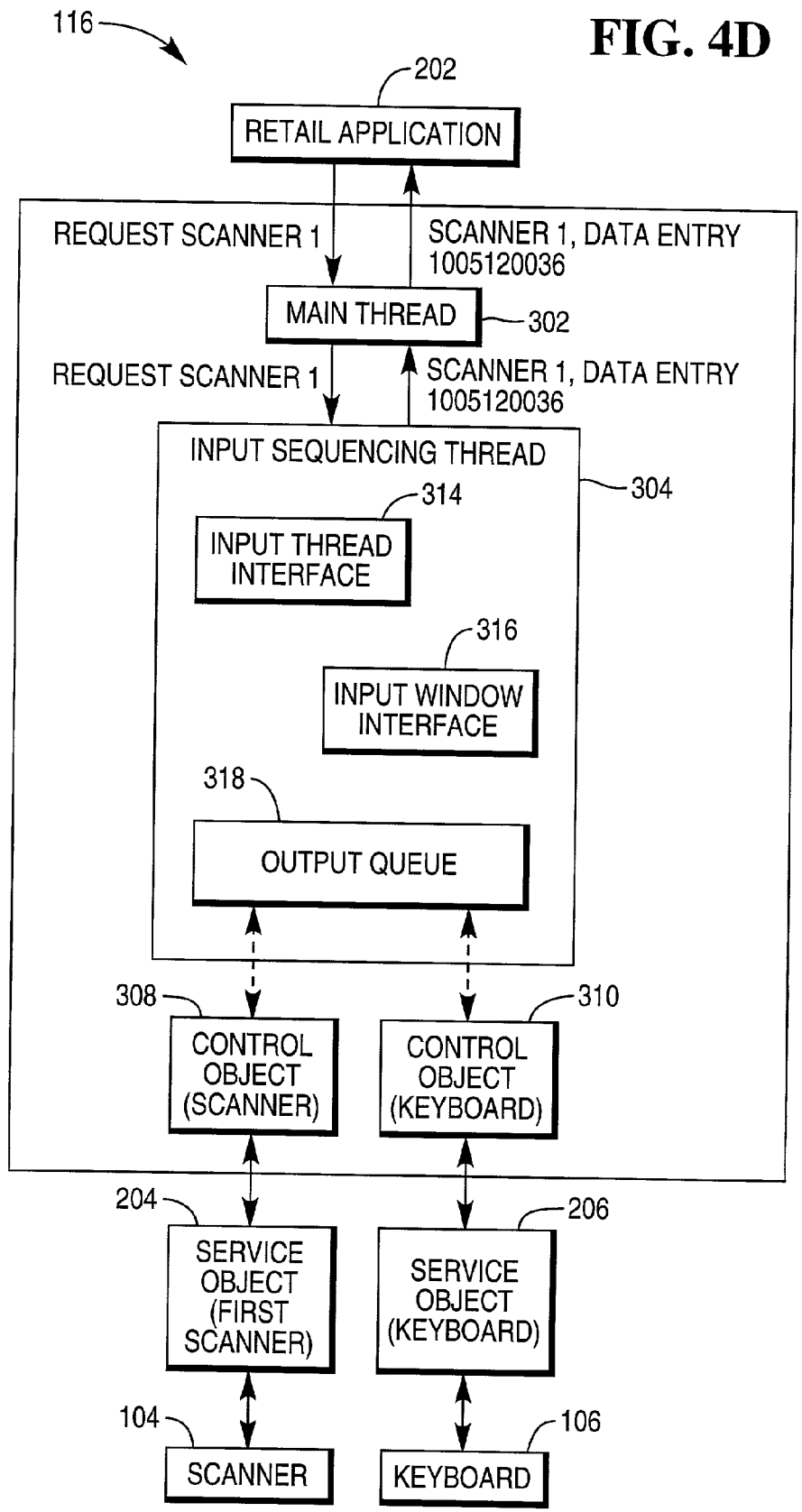

FIG. 4D illustrates the transfer of a second stored data object in response to a request from the retail application. The retail application 202 presents a request for data from scanner 1. The main thread 302 relays this request to the input sequencing thread 304, which examines the topmost data object from the queue 318 and, because its device identification matches the requested device identification, removes it from the queue and transfers it to the requesting application, that is, the retail application 202.

To provide a specific example of the processing of a transaction by the point of sale terminal 100, return to FIGS. 1 and 2 and suppose that an operator wishes to process a transaction for the purchase of one case of soda, five boxes of cereal, one loaf of bread and five pounds of bulk flour. The operator first uses the scanner 105 to scan the universal product code (UPC) on the case of soda. When not otherwise occupied, the retail application 202 sequentially produces requests for data from the first and second scanner, the keyboard and the scale. In response to the requests for data from the first scanner, the DSM 116 returns a response that no data exists. When the DSM 116 receives the request for data from the second scanner, it returns the UPC for the case of soda to the retail application 202. When the DSM 116 receives requests for data from the keyboard and the scale, it again returns a response that no data exists. Upon receiving the UPC for the case of soda, the retail application 202 looks up the UPC for the case of soda, retrieves the price and description of the soda and communicates with the operator interface 212 to display the UPC for the case of soda, as well as a description of the product. The retail application 202 also makes a transaction entry. The operator then enters the number "5" using the keyboard 106. The keyboard 106 produces a data entry which is received and stored by the DSM 116. Because the retail application 202 is displaying the previous data object and making a transaction entry, the retail application 202 is not immediately ready to receive and so does not request the data object produced by the keyboard 106, which is the number "5". The operator then uses the scanner 104 to scan the universal product code (UPC) on one box of cereal. The DSM 116 receives and stores the data object produced by the scanner 104. By this time, the retail application 202 is once again ready to receive data objects, and so it requests and receives data from the keyboard 106 and from the scanner 104. The retail application 202 prepares a transaction entry reflecting the purchase of the five boxes of cereal. Next, the operator uses the scanner 104 to scan the UPC on a loaf of bread. The DSM 116 receives and stores the data object produced by the scanner 104 and the retail application 202 then requests and receives this data object. The retail application 202 then prepares a transaction entry reflecting the purchase of the loaf of bread.

In this example, the retail application 202 was not ready to receive the keyboard entry when this data item was first available. If this data item had been buffered by the keyboard service object 206, the UPC from the box of cereal would have been presented to the retail application 202 before the keyboard entry. The UPC from the loaf of bread would have been presented to the retail application 202 immediately after the keyboard entry. The transaction would have reflected the purchase of one case of soda, one box of cereal and five loaves of bread, instead of the correct transaction, which was for one case of soda, five boxes of cereal and one loaf of bread.

Next, the operator uses the scanner 105 to scan a UPC reflecting the purchase of bulk flour. The DSM 116 receives and stores this data item and then furnishes it to the retail application 202 upon request. The retail application 202 looks up the UPC, notes that the UPC identifies a product sold by weight, and activates the scale 108. The operator then places a container of flour on the scale 108. The DSM 116 polls the scale 108 at intervals until a nonzero stable weight different from a previous stable weight is received. The DSM 116 then stores this weight, in this case five pounds, and furnishes it to the retail application 202 upon request. The retail application 202 then deactivates the scale 108. Because no more products remain to be entered in the transaction, the operator makes an appropriate entry using the keyboard 106. This keyboard entry is stored by the DSM 116 and furnished to the retail application 202 upon request. Upon receiving the operator keyboard entry, the retail application 202 concludes the transaction and directs processing of payment.

The DSM 116 is defined by a set of properties and methods. These properties and methods present a defined interface to all external objects which interact with the DSM. The properties describe operational characteristics and settings of the DSM, such as devices which are available for interaction with the DSM, a description of these devices, file versions used by the DSM and similar information needed to describe selected details of the DSM operation. The methods are used by external objects to direct the DSM to perform various operations, such as initiation and setup, enabling of devices, delivering data from the output queue 318 to the requesting object, and any other operations performed at the request of an external object. The properties and methods of an exemplary implementation, following the ACS protocol and employing the WINDOWS 2000 operating system are detailed below:

AvailableDevices Property

| | |
|---|---|
| Syntax | HRESULT GetAvailableDevices(LONG DeviceClass, LONG *NumberOfDevices) |
| Description | Returns the number of available devices of the indicated class type. The scanner, scale, and keyboard access methods should use this to determine if the Open( ) was successful for their control. If it was not, NumberOfDevices will not be correct. It will be 0 if the open failed for the scale or the keyboard. If one or both of the scanners failed, NumberOfDevices will be 1 or 0. |
| HRESULTS returned | S_OK<br>DM_E_ILLEGAL<br>DM_E_INVALIDDEVICECLASS |

| | | |
|---|---|---|
| DeviceDescription Property | | |
| Syntax | HRESULT GetDeviceDescription(LONG DeviceID, LONG DeviceClass, BSTR *Description) | |
| Description | Returns device-specific information. An example description is: | |
| | "NCR 7156 Printer: Thermal Receipt; Impact Slip" | |
| | It is the responsibility of the calling object to free the memory allocated for the BSTR using SysFreeString( ). | |
| HRESULTS returned | S_OK | |
| | DM_E_ILLEGAL | |
| | DM_E_INVALIDDEVICEID | |
| | DM_E_DEVICENOTCONFIGURED | |
| | DM_E_INVALIDDEVICECLASS | |
| FileDescription Property | | |
| Syntax | HRESULT GetFileDescription(BSTR *Description) | |
| Description | Returns FileDescription string defined in VERSIONINFO Resource. | |
| | It is the responsibility of the calling object to free the memory allocated for the BSTR using SysFreeString( ). | |
| HRESULTS returned | S_OK | |
| | DM_E_ILLEGAL | |
| FileVersion Property | | |
| Syntax | HRESULT GetFileVersion(BSTR *Version) | |
| Description | Returns FileVersion string defined in VERSIONINFO Resource. | |
| | It is the responsibility of the calling object to free the memory allocated for the BSTR using SysFreeString( ). | |
| HRESULTS returned | S_OK | |
| | DM_E_ILLEGAL | |
| LegalCopyright Property | | |
| Syntax | HRESULT GetLegalCopyright(BSTR *Legal Copyright) | |
| Description | Returns LegalCopyright string defined in VERSIONINFO Resource. | |
| | It is the responsibility of the calling object to free the memory allocated for the BSTR using SysFreeString( ). | |
| HRESULTS returned | S_OK | |
| | DM_E_ILLEGAL | |
| ScaleWeightUnits Property | | |
| Syntax | HRESULT GetScaleWeightUnits(LONG DeviceID, LONG *Units); | |
| Description | This property returns the current scale weight units. Possible values for Units include: | |
| | DM_SCALE_WU_GRAM | |
| | DM_SCALE_WU_KILOGRAM | |
| | DM_SCALE_WU_OUNCE | |
| | DM_SCALE_WU_POUND | |
| HRESULTS returned | S_OK | |
| | DM_E_ILLEGAL | |
| | DM_E_INVALIDDEVICEID | |
| | DM_E_DEVICENOTCONFIGURED | |
| | DM_E_DEVICENOTAVAILABLE | |
| ScannerPacesetterEnabled Property | | |
| Syntax | HRESULT GetScannerPacesetterEnabled(LONG DeviceID, LONG *Enable Value); | |
| | HRESULT SetScannerPacesetterEnabled(LONG DeviceID, LONG EnableNewValue); | |
| Description | The ScannerPacesetterEnabled property controls the enabling and disabling of Scanner Pacesetter operation. Pacesetter operation is a mode in which the scanner appends information about the scan tag quality to each UPC and EAN tag read. It is only available when using the NCR 7870, 7875 and 7880 scanners. If EnableNewValue is TRUE, Scanner Pacesetter operation is enabled. Otherwise, Scanner Pacesetter support is disabled. Scanner Pacesetter operation is always initially disabled. The Pacesetter information appended to each tag is 3 bytes in length and has the format 43 3Y 3Z where Y and Z are as follows: | |
| Y Z | Description | |
| 1 | Decoding was difficult; may be inconsistent printing. | |
| 2 | Fragmented or folded label or inconsistent printing. | |
| 3 | Decoding was difficult due to fragmented, folded or inconsistently printed label. | |
| 1 | Label appears to be highly underprinted. | |
| 2 | Label appears to be highly overprinted. | |
| 4 | Label appears to have missing bars or margins. | |
| 5 | Label appears to be highly underprinted and to have missing bars or margins. | |
| 6 | Label appears to be highly overprinted and to have missing bars or margins. | |
| 0 0 | Label was decoded without major problems. | |
| 9 9 | If a particular label intermittently shows this code, the label should be analyzed more closely for out of specification conditions, even though the label may show a "code 00," when it does scan (printing may be inconsistent). | |
| HRESULTS returned | S_OK | |
| | DM_E_ILLEGAL | |
| | DM_E_INVALIDDEVICEID | |
| | DM_E_DEVIGENOTCONFIGURED | |
| | DM_E_DEVICENOTAVAILABLE | |

-continued

| | |
|---|---|
| ClearInput Method | DM_E_NOTSUPPORTED (returned for SetScannerPacesetterEnabled only) |
| Syntax | HRESULT ClearInput(LONG, DeviceID, LONG DeviceClass)<br>Description<br>This method clears all buffered Input Events for a specific device class or for all device classes. The DeviceID parameter can be a valid DeviceID (0 or 1) or DM_ALL_DEVICEIDS to specify all DeviceIDs for the specified class. The DeviceClass parameter can be a valid DeviceClass such as DMCLASS_SCANNER or DM_ALL_DEVICECLASSES to specify all device classes. This clears all messages, both data and error messages, in DSM's output queue for the specified device or devices. If a device is disabled, using the Enable( ) method, and the access method requires that all messages should be cleared, the ClearInput( ) method must be run on the disabled device.<br>For the keyboard and the scanner, this method also runs ClearInput( ) methods belonging to the control objects for the scanner and the keyboard to clear any data buffered in the controls. It does not run the scale's ClearInput because the scale does not fire events. |
| HRESULTS returned | S_OK<br>DM_E_ILLEGAL<br>DM_E_INVALIDDEVICECLASS |
| See Also<br>Close Method | |
| Syntax<br>Description | HRESULT Close(void)<br>This command instructs Device Sequence Manager to close and clean up all device connections. If a device error occurs during cleanup, an error is logged and DM_SUCCESS is returned. In the case of OPOS devices, Device Sequence Manager will issue the following:<br><opos control>.Close( ) |
| HRESULTS returned | S_OK<br>DM_E_ILLEGAL |
| See Also<br>Dequeue Method | |
| Syntax | HRESULT DsmDq(LONG DeviceID, LONG DeviceClass, LONG *InputType, VARIANT *DeviceData) |
| Description | Input is requested by the DsmDq method. The requester specifies the Device ID and Device Class in the first two arguments. DSM compares these values with the Device ID and Device Class of the top item on the queue.<br>If they match and the item contains data, DSM returns DM_DATA in InputType and data in DeviceData as described below.<br>If they match and the item contains an error, DSM returns DM_ERROR in InputType and error data in DeviceData as described below.<br>If they do not match, DSM returns DM_NODATA in InputType and does not modify DeviceData.<br>The VARIANT structure, DeviceData, contains device data that is common for all devices within a Device Class. The varDeviceData structure is a union of data types. The correct VARIANT type used for each device class is defined below.<br>The DeviceID is used to differentiate between multiple devices of the same class. The InputType can then be examined to determine whether the event represents data or an error as follows: |

Valid Input Type values:
DM_DATA
DM_ERROR
DM_NODATA
varDeviceData Format:
The types of device data are defined below by device class. If InputType is DM_DATA varDeviceData can have the following formats.
DMCLASS_SCALE (VT_I4): The Scale weight is returned as a 4-byte signed integer with an assumed decimal place located after the "thousands" digit position. For example, a returned value of 12345 represents 12.345, and a returned value of 5 represents 0.005.
DMCLASS_SCANNER (VT_BSTR): Device Sequence Manager will pass scan code data to the application. The application will determine the scan code type during its processing (e. g. NSC type). It is the caller's responsibility to free the memory allocated for the BSTR using SysFreeString( ).
DMCLASS_KEYBOARD (VT_I4): The Keyboard data will be returned in a long integer containing the 16-bit scan code followed by the 16-bit ASCII code. The ScanCode/ASCII Code interception is end-user configurable in the OPOS Registry.
Example: the data returned when a '1' is pressed will be 0x0002 followed by 0x0031.
If InputType is DM_ERROR, varDeviceData can have the following formats.
DMCLASS_SCALE (VT_I4):
The scale does not put error status messages in the queue.
DMCLASS_SCANNER (VT_I4):
DM_ERROR_GENERALFAILURE (-1)
DM_ERROR_SCAN_DATALOSS (-20)
DM_ERROR_SCAN_BADTAGSUFFIX (-21)
DM_ERROR_SCAN_BADTAGPREFIX (-22)
DM_ERROR_SCAN_BADTAG (-23)
DM_ERROR_SCAN_SERIAL (-24)
DMCLASS_KEYBOARD (VT_I4):
DM_ERROR_GENERALFAILURE (-1)

| | |
|---|---|
| HRESULTS returned | S_OK<br>DM_E_ILLEGAL<br>DM_E_INVALIDDEVICEID<br>DM_E_DEVICENOTCONFIGURED<br>DM_E_DEVICENOTAVAILABLE |

-continued

| | |
|---|---|
| | DM_E_INVALIDDEVICECLASS |
| See Also | |
| Enable Method | |
| Syntax | HRESULT Enable(LONG DeviceID, LONG DeviceClass, BOOL fEnable) |
| Description | Enables or disables a specific device within a specified device class. Input data will only be generated for devices that are enabled. To enable all devices within a DeviceClass, set the DeviceID parameter to DM_ALL_DEVICEIDS. Scanners and scales will have an initial state of "disabled". If a device with buffered data is disabled, the buffered data is not discarded. It is therefore possible to receive data for a disabled device. Below is a description of the enable/disable operation for each device class: DMCLASS_SCALE: When the application configures a DMCLASS_SCALE object, Device Sequence Manager will create a DMCLASS_SCALE thread that attempts to read a stable scale weight when the scale is enabled. When a stable weight is read and the weight is non-zero and different from the previous stable weight, a message is added to DSM's output queue so that it can be sent to the application. When disabled, the scale does not allow the weight to be read, although it does keep its integrated display up to date. DMCLASS_SCANNER: When enabled, scanned items will be added to DSM's output queue. When disabled, the scanner does not scan (its red light blinks). DMCLASS_KEYBOARD: Always enabled. |
| Parameters | |
| DeviceID | Device ID of the requested device. If DM_ALL_DEVICEIDS, all devices in the specified class are enabled or disabled. |
| DeviceClass | Device class type of the requested device. |
| fEnable | If TRUE, the device is enabled; otherwise it is disabled. |
| HRESULTS returned | S_OK<br>DM_E_ILLEGAL<br>DM_E_INVALIDDEVICEID<br>DM_E_DEVICENOTCONFIGURED<br>DM_E_DEVICENOTAVAILABLE<br>DM_E_INVALIDDEVICECLASS<br>DM_E_DEVICEFAILURE |
| See Also | |
| Monitor Scale Weight Method | |
| Syntax | HRESULT MonitorScaleWeight(LONG DeviceID, LONG *Weight); |
| Description | This property returns the results from the last live weight request. DSM polls the scale every ¼ second and stores the result which is returned here. This is intended for the customer display. Pricing should be based on the weight retrieved from the queue, using the Dequeue method. The returned weight has an assumed decimal place located after the "thousands" digit position. For example, an actual value of 12345 represents 12.345, and an actual value of 5 represents 0.005. Possible return values include:<br>Weight = 0: stable weight is zero<br>Weight > 0: stable weight is Weight using implied decimal place<br>Weight < 0: Weight is one of the following:<br>DM_ERROR_SCALE_UNSTABLE: scale is unstable<br>DM_ERROR_SCALE_OVERWEIGHT: scale exceeds max capacity<br>DM_ERROR_SCALE_UNDERZERO: scale weight is less than zero<br>DM_ERROR_GENERALFAILURE: general device failure (unrecognized response) |
| HRESULTS returned | S_OK<br>DM_E_ILLEGAL<br>DM_E_INVALIDDEVICEID<br>DM_E_DEVICENOTCONFIGURED<br>DM_E_DEVICENOTAVAILABLE |
| NotOnFileTone Method | |
| Syntax | HRESULT NotOnFileTone(LONG DeviceID); |
| Description | This method disables the scanner (on scanners that support disable), causes the red light to flash (787× scanner/scale) and sounds the tone.<br>To stop the tone, the caller must enable and then disable the device. |
| HRESULTS returned | S_OK<br>DM_E_ILLEGAL<br>DM_E_INVALIDDEVICEID<br>DM_E_DEVICENOTCONFIGURED<br>DM_E_DEVICENOTAVAILABLE |
| Open Method | |
| Syntax | HRESULT Open(void) |
| Description | This command instructs Device Sequence Manager to initialize device objects configured in the System Registry. For OPOS devices, Device Sequence Manager initialization includes the following:<br><opos control>.Create( )<br><opos control>.Open( )<br><opos control>.Claim( )// if OPOS control is an exclusive use device<br>Additionally, when DMCLASS_SCALE device is opened, a separate "Scale" thread is created. This dedicated thread is needed for OPOS scale devices because weights must be polled. Details on the scale thread are provided in the Enable(DMCLASS_SCALE) and Multithreading sections.<br>The scanner and the scale will be initialized to a disabled state; the keyboard will be enabled. DSM logs an error if an error occurs during the device initialization sequence but it does not return an error to the client. It is up to the application to examine the AvailableDevices property to determine if a device of a specific class has been successfully initialized. |

| | During the Open( ), Device Sequence Manager reads the VERSIONINFO Resource information, initializes the "FileDescription", "FileVersion", and "LegalCopyright" properties and sets these same properties as Registry values under the HKEY_LOCAL_MACHINE "Device Sequence Manager" key. |
|---|---|
| HRESULTS returned | S_OK |
| | DM_E_ILLEGAL |
| | CTL_E_OUTOFMEMORY |
| | DM_E_REGISTRY |
| | DM_E_CREATEMUTEXFAILED |

Figure 5A:
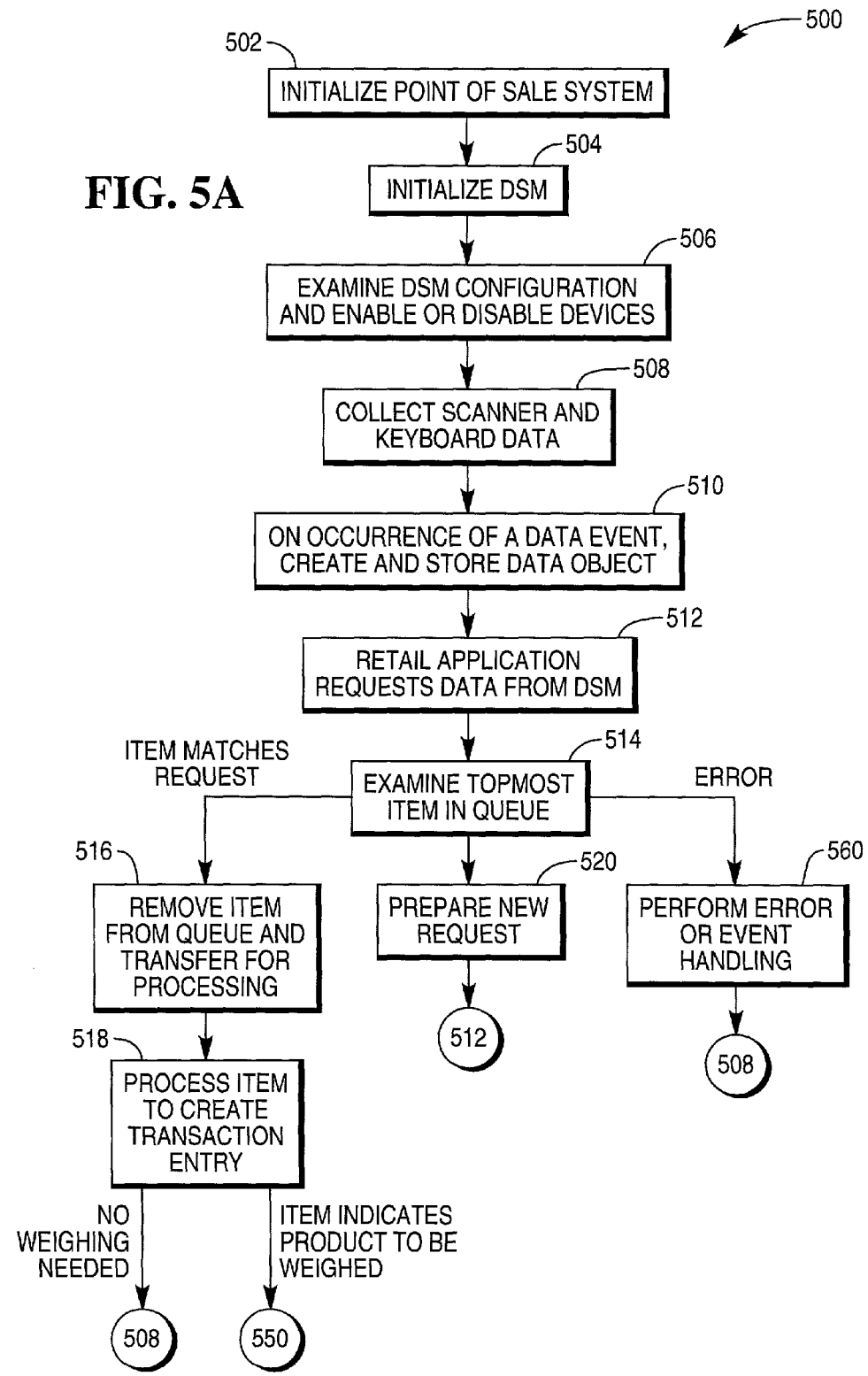
FIG. 5 illustrates a process of point of sale system operation according to the present invention.
Figure 5B:
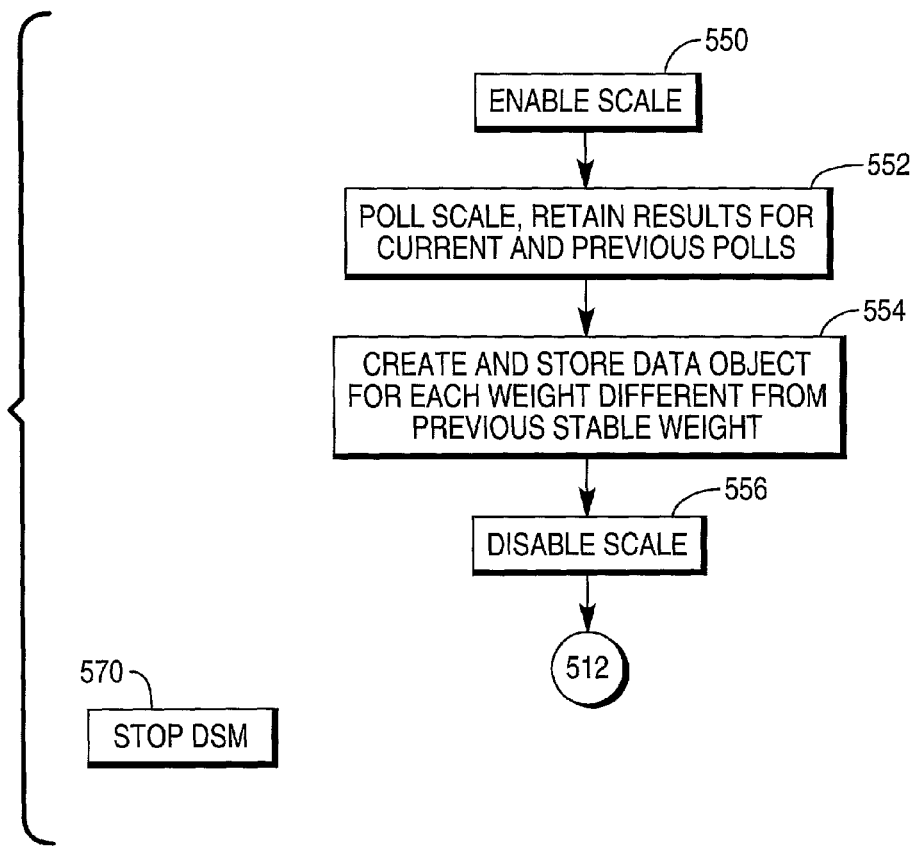

FIG. 5 illustrates a process 500 of point of sale system operation according to the present invention. At step 502, operation of a point of sale system is initialized. The point of sale system may suitably be similar to the system 100 of FIG. 1, including a plurality of devices for collecting data and providing an operator interface, and preferably employs software and data organized into independent objects. Initiation of the point of sale system operation initializes the various software objects and identifies the specific configuration of the point of sale system, including the presence and identity of the various input and output devices. At step 504, a retail application controlling the operation of the point of sale system initializes a device sequence manager (DSM) controlling the point of sale system. At step 506, the retail application examines the configuration of the DSM as necessary and issues commands to enable or disable devices as desired.

At step 508, data is collected by a scanner and keyboard belonging to the point of sale system. At step 510, whenever data is received by the scanner or the keyboard, a data event occurs and is provided to the device sequence manager, which converts the event to a data object, preferably including identifying information identifying the device capturing the data as well as a data item reflecting the data. The data object is placed in an output queue for storage until needed. At step 512, whenever the retail application is free to receive data, the retail application issues a request to the device sequence manager for the data. The request suitably includes identifying information for the device from which the data is expected and is one of a sequence of requests, each request identifying an available device, the entire sequence of requests identifying all available devices. At step 514, the topmost item in the output queue is examined. If the topmost item in the output queue matches the identifying information in the request and data is present in the item, the process proceeds to step 516 and the information is removed from the queue and transferred for processing. The process then proceeds to step 518 and the data object is processed for use in creating a transaction entry. If the data object indicates an item that must be weighed, the process proceeds to step 550. If the data object does not indicate an item that must be weighed, the process returns to step 508.

Returning now to step 514, if the topmost item in the output queue does not match the request, the process proceeds to step 520 and a new request is prepared, including identifying information for the next device to be identified in the sequence of requests. The process then returns to step 512. Returning again to step 514, if the response to the data request contains an error, the process proceeds to step 560. At step 560, the retail application performs any required error or event handling, for example issuing error messages to an operator, repeating requests or issuing any necessary commands to the device sequence manager. The process then returns to step 508.

Returning now to step 550, the retail application enables the scale. At step 552, the scale is periodically polled, with results retained for the current poll and the previous poll. Whenever the scale produces a stable weight different from the most recent stable weight, the process proceeds to step 554 and the weight is converted to a data object and placed in the output queue and any previous weight data appearing in the output queue is removed. At step 556, the retail application disables the scale. The process then returns to step 512.

When operation of the point of sale system is to be terminated, or when the operation of the device sequence manager is to be halted for any reason, the process proceeds to step 570 and the retail application issues a command to close the device sequence manager.

While the present invention is disclosed in the context of a presently preferred embodiment, it will be recognized that a wide variety of implementations may be employed by persons of ordinary skill in the art consistent with the above discussion and the claims which follow below.

We claim:

1. A method of operating a transaction processing system, comprising:

identifying disparate devices, having associated disparate software including device dependent service objects for operating the disparate devices, coupled to a point-of-sale terminal by a device sequence manager on the point-of-sale terminal which handles all communication between a transaction processing application on the point-of-sale terminal and the device dependent service objects;

enabling communication with the disparate devices through device dependent service objects by the device sequence manager;

receiving data produced by one or more of the disparate devices from respective device dependent service objects by the device sequence manager;

creating one or more data objects by the device sequence manage, each data object comprising the data produced by and received from one of the disparate devices and first identifying information identifying the device that produced the data;

placing each of the one or more data objects into a queue by the device sequence manager where the data objects in the queue are ordered by when the data in each data object was produced by the respective disparate devices;

receiving a data retrieval request including second identifying information from a transaction processing application of the point-of-sale terminal by the device sequence manager;

determining if the second identifying information matches the first identifying information of the data object next in sequence for retrieval from the queue by the device sequence manager; and transferring the data object next in sequence for retrieval from the queue to the transaction processing application if the second identifying information matches the first identifying information by the device sequence manager.

2. The method of claim 1, further comprising:
notifying the transaction processing application that no data exists by the device sequence manager if the second identifying information does not match the first identifying information of the data object next in sequence for retrieval from the queue.

3. The method of claim 2, further comprising:
receiving a new data retrieval request including third identifying information from the transaction processing application by the device sequence manager upon notifying the transaction processing application that no data exists.

4. The method of claim 1, wherein the disparate devices comprise scanners, keyboards, and scales that respectively produce data for scanner data objects, keyboard data objects, and scale data objects.

* * * * *